(12) United States Patent
Hettich et al.

(10) Patent No.: US 6,188,954 B1
(45) Date of Patent: Feb. 13, 2001

(54) INTERNAL COMBUSTION ENGINE WITH ELECTRONIC COMPONENTS CONTROLLED FROM A CENTRAL UNIT

(75) Inventors: Gerhard Hettich, Dietenhofen; Jürgen Schenk, Albershausen, both of (DE)

(73) Assignees: Temic Telefunken microelectronic GmbH, Heilbronn; Daimler-Benz Aktiengesellschaft, Stuttgart, both of (DE)

(*) Notice: Under 35 U.S.C. 154(b), the term of this patent shall be extended for 0 days.

(21) Appl. No.: 09/113,169
(22) Filed: Jul. 10, 1998

(30) Foreign Application Priority Data

Jul. 12, 1997 (DE) .............................. 197 29 959

(51) Int. Cl.$^7$ ................................................ F02D 45/00
(52) U.S. Cl. .......................................... 701/115; 123/490
(58) Field of Search .................................. 701/103, 115; 123/476, 477, 478, 480, 490

(56) References Cited

U.S. PATENT DOCUMENTS

| 2,617,841 | 11/1952 | Linder | 123/606 |
|---|---|---|---|
| 3,934,566 | 1/1976 | Ward | 123/275 |
| 4,637,368 | * 1/1987 | Gillbrand et al. | 123/647 |
| 4,938,200 | * 7/1990 | Iwasaki | 123/606 |
| 5,304,899 | 4/1994 | Sasaki et al. | 318/16 |
| 5,749,060 | * 5/1998 | Graf et al. | 701/51 |

FOREIGN PATENT DOCUMENTS

| 22 07 392 | 8/1973 | (DE) . |
|---|---|---|
| 29 24 910 | 1/1981 | (DE) . |
| 3609069C2 | 7/1988 | (DE) . |
| 3912497A1 | 10/1990 | (DE) . |
| 4034578A1 | 5/1992 | (DE) . |
| 4324500A1 | 1/1994 | (DE) . |
| 0 126 985 | 12/1984 | (EP) . |
| 2 232 851 | 12/1990 | (GB) . |
| WO 82 00199 | 1/1982 | (WO) . |

OTHER PUBLICATIONS

IBM Technical Disclosure Bulletin, vol. 32, No. 12, May 1990, S. 454 bis 456.

* cited by examiner

*Primary Examiner*—Andrew M. Dolinar
(74) *Attorney, Agent, or Firm*—Venable; Norman N. Kunitz

(57) ABSTRACT

An internal combustion engine with electronic components controlled from a central unit, where electrical leads as conductive connection for power transmission and data transmission between the electronic components of the internal combustion engine are avoided completely wherever possible. The electronic components to be controlled from a central unit are arranged, together with the central unit, on the engine in a space that is fully enclosed by a metal housing part, power is supplied to at least some of the electronic components by high frequency electromagnetic waves generated and radiated without cables by a high frequency source arranged in the space enclosed by the metal housing part and the components to be supplied with power by the radiated electromagnetic waves from the high frequency source each have at least one receiving device for receiving the electromagnetic waves.

8 Claims, 2 Drawing Sheets

# INTERNAL COMBUSTION ENGINE WITH ELECTRONIC COMPONENTS CONTROLLED FROM A CENTRAL UNIT

BACKGROUND OF THE INVENTION

The invention relates to an internal combustion engine with electronic components controlled from a central unit and arranged together with the central unit in a fully enclosed metal part of the internal combustion engine.

Modern internal combustion engines are controlled to an increasing extent electronically and require a number of electronic components for this purpose, in particular sensors, actuators and associated control units. Such sensors include, for example, digital Hall sensors with which the rotational speed of the crankshaft can be determined. As an example of actuators, solenoid valves can be named with which the valve needle is controlled in fuel injectors. The sensors and actuators are connected via supply lines to a voltage source and connected via control lines to a control unit or to a central unit. These supply and control lines are usually connected at both ends by means of plug contacts to the electronic components and to the control unit or central unit. In motor vehicles, the entire supply and control leads are grouped together to form the so-called cable tree.

The disadvantage of cable trees made up in this way is the high number of plug contacts needed between the electronic components and the electrical leads. These plug contacts represent the main source of faults in the case of motor vehicle malfunctions.

SUMMARY OF THE INVENTION

The object of the invention is to specify an internal combustion engine with electronic components controlled from a central unit, where the number of electrical leads and thus the plug contacts between the electrical components and the control unit or the central unit of the internal combustion engine is significantly reduced.

This object is accomplished in accordance with the invention in that the power to at least some of the electronic components is transmitted without cables by electromagnetic waves generated in a high-frequency source and radiated in a fully enclosed metal housing part of the internal combustion engine. Correspondingly, the electronic components concerned are provided with receiving devices for receiving the electromagnetic waves. The high-frequency source arranged in the fully enclosed metal housing part can be a constituent part of the central unit.

The fully enclosed metal housing part of the internal combustion engine can be designed in such a way that the field strength of the electromagnetic waves at the receiving devices of the electronic components is high, i.e., that potential antinodes form at the receiving devices of the electronic components in the field strength curve of the electromagnetic wave.

The energy of the electromagnetic waves can additionally be supplied via waveguides to unfavorably placed electronic components with high power consumption within the fully enclosed metal housing part.

The energy can be transmitted without cable via loose transformer coupling, as known for example from DE 39 12 497, or by means of inductive coupling to electronic components placed at locations within the fully enclosed metal housing part of the internal combustion engine at which they cannot be reached by the electromagnetic waves.

In a further development of the invention, supply leads can be avoided in the fully enclosed metal housing part of the internal combustion engine by making use of locally available potential gradients in order to obtain electrical energy for the supply of electronic components.

In an advantageous further development of the invention, provision is made for equipping the electronic components, the high-frequency source and the central unit with devices for wireless data transmission in order to reduce the number of electrical leads and plug contacts. The wireless data transmission between the electronic components, the high-frequency source and the central unit can be utilized by means of loose transformer coupling, and/or inductive coupling, and/or IR sections, and/or optical waveguides and/or electromagnetic alternating fields of suitable frequency.

In a design of this kind of an internal combustion engine with its electronic components, supply and data leads and also plug contacts are avoided to a large extent thereby greatly reducing the susceptibility to faults of the internal combustion engine. The already existing fully enclosed metal housing parts of an internal combustion engine, such as those formed by the cylinder head or the valve cover, are utilized effectively.

DESCRIPTION OF A PREFERRED EMBODIMENT

Figure 1:
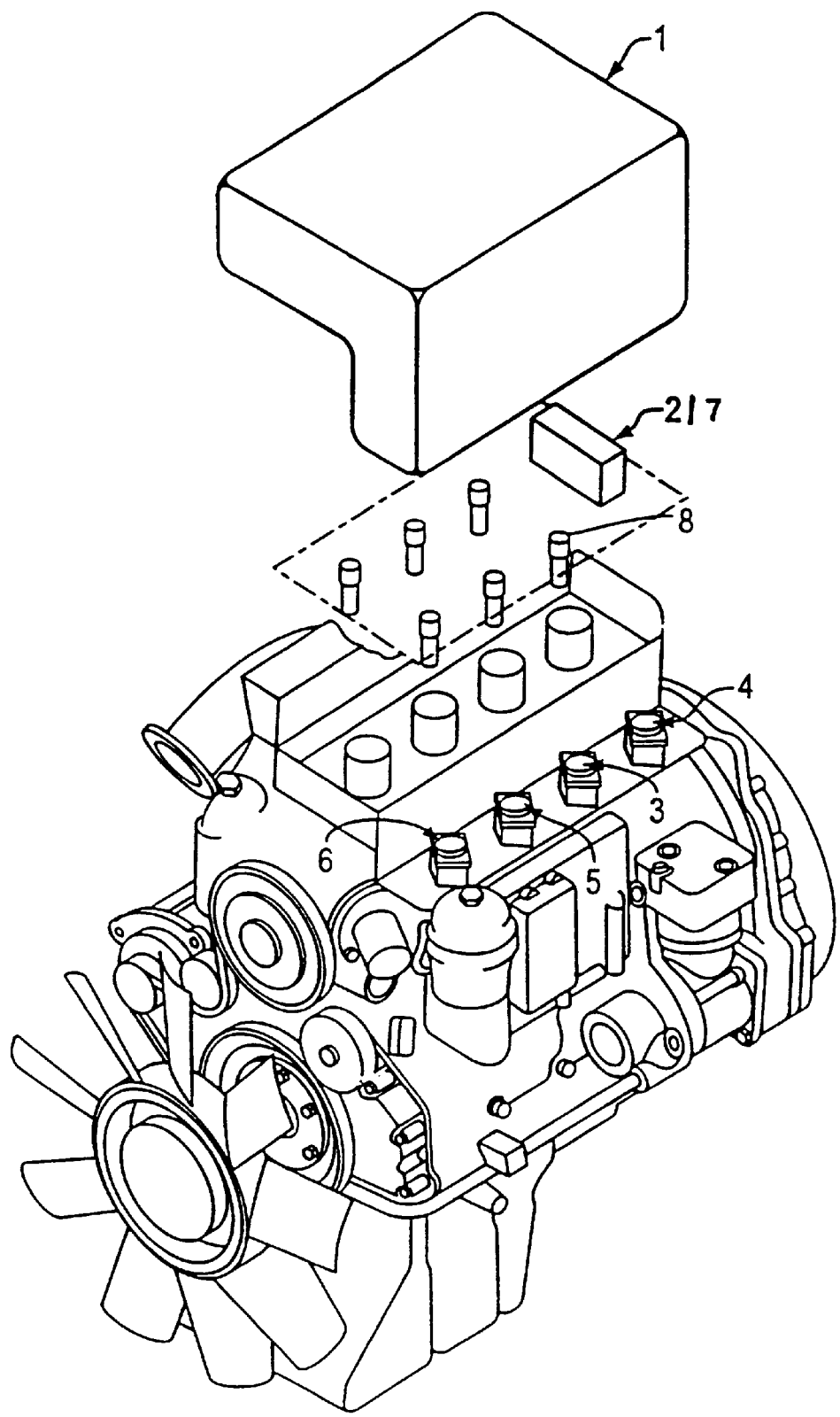
FIG. 1 is a schematic drawing of an internal combustion engine with a fully enclosed metal housing part formed by the valve cover.
Figure 2:
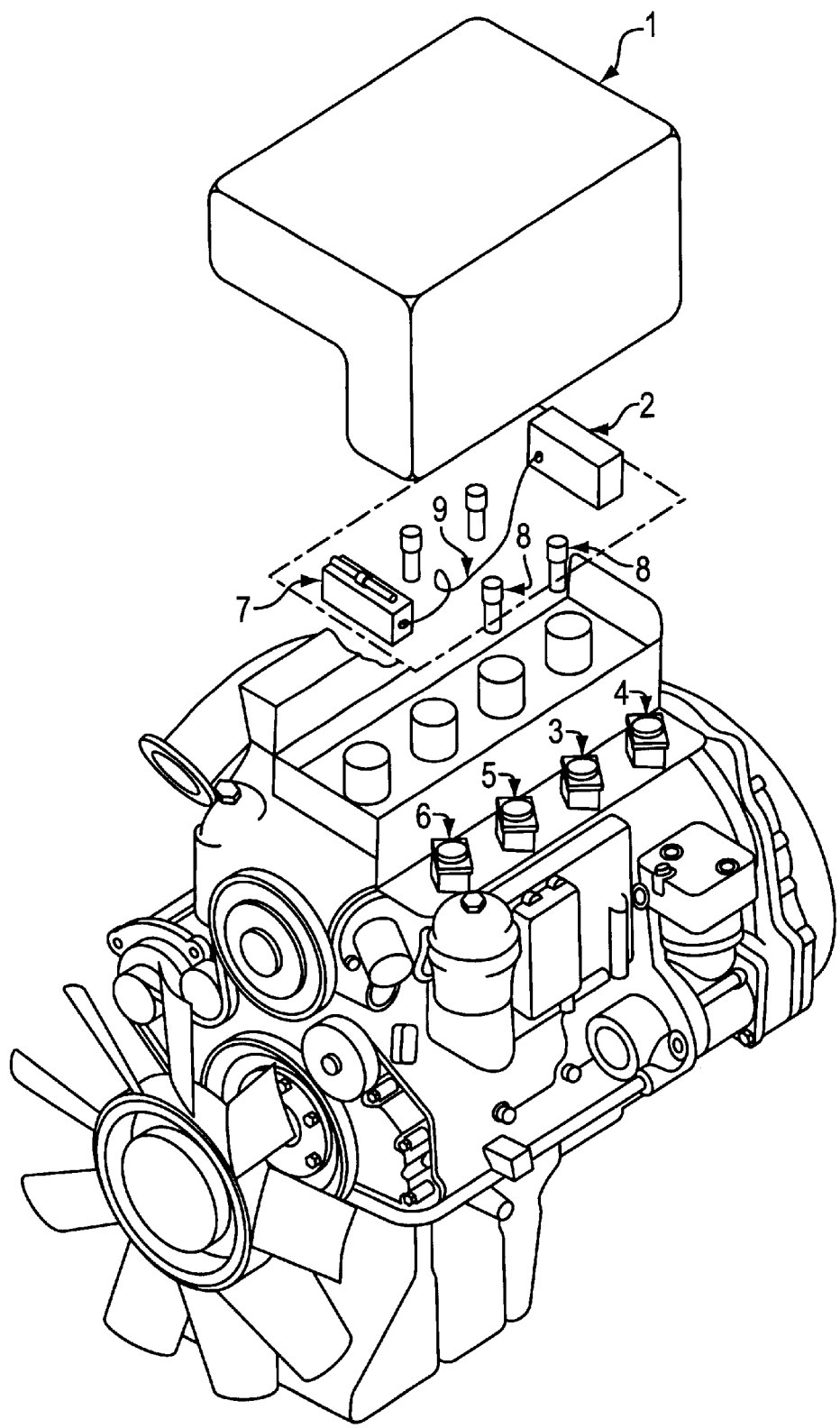
FIG. 2 is a schematic drawing showing a modification of the arrangement of FIG. 1.

The FIGS. 1 and 2 show schematically a four-cylinder internal combustion engine for a motor vehicle with fuel injection. The metal valve cover 1 of the internal combustion engine also encloses the four fuel injectors 3–6 and together with the cylinder head forms a hollow space that is fully enclosed by metal. This hollow space is impermeable to electromagnetic waves, on the principle of the Faraday cage. Apart from the fuel injectors 3–6, which inject the fuel by means of solenoid valves, another device is provided in this hollow space as an additional electronic component for determining the rotational speed of the camshafts. These electronic components are controlled by means of a central unit 2 which is also situated in the hollow space in an enclosed housing. The central unit 2 is supplied with electricity through a supply lead from the generator of the internal combustion engine. Furthermore, the central unit 2 is connected via a CAN bus to other electrical modules belonging to the motor vehicle. The voltage supply to the electronic components situated in the hollow space is accomplished by means of high-frequency electromagnetic waves generated and radiated within the hollow space formed by the cover 1 by a high frequency source 17 likewise beneath the cover 1 as shown in FIG. 2. However, the high frequency source 7 may likewise be disposed within the control unit 2 as shown in FIG. 1.

These high-frequency electromagnetic waves are picked up by means of the receiving devices fitted to the electronic components e.g., the solenoid valves of the fuel injectors 2–6, in the form of antennas and transformed to the voltage required by the respective electronic component.

The metal valve cover 1 of the internal combustion engine is shaped in such a way that the high-frequency electromagnetic waves form a standing wave in the hollow space. In the so-called potential node of the standing wave the intensity is low, but in the so-called potential antinode of the standing wave the intensity is high. Consequently, electronic components such as the solenoid valves of the fuel injectors 3–6 with their high power consumption are placed in the hollow space such that their antennas are located in the potential antinodes of the standing electromagnetic wave. in regions within the hollow space that can be reached only inadequately by the electromagnetic waves, the intensity of the electromagnetic waves can be raised by supplying additional electromagnetic waves via waveguides 8.

Data transmission from the central unit 2 to the fuel injectors 3–6 takes place without wires by means of an infrared (IR) data section. The injection times which are calculated by the central unit 2 and which depend on the rotational speed, and the injection periods are transmitted to the fuel injectors 3–6. The central unit 2 has an IR diode as transmission element and the fuel injectors have a photocell as a receiving element. Data transmission is effected directly or by reflection from metal parts of the hollow space. Data transmission between the control unit 2 and other components, e.g., the high frequency source 7, may additional take place via an optical cable or wave guide 9, as shown in FIG. 2.

For the purpose of determining the rotational speed of the camshafts and the crankshaft, a coil is fitted to the crankshaft in which a voltage is induced magnetically. An electrical circuit situated on the crankshaft is supplied with this voltage. One part of the circuit consists of a transmitter that transmits signal pulses that are proportional to the rotational speed of the crankshaft. For transmission, a frequency is selected that differs from the frequencies of other electromagnetic radiation sources in the hollow space. A device is provided on the housing of the central unit 2 for receiving the frequency of the transmitter. The central unit 2 determines the rotational speed of the crankshaft from the transmitted signal pulses. In order to accomplish the aim of achieving an internal combustion engine without cables, at least a large proportion of the power and data transmission leads can be dispensed with by making use of various technologies. For the electronic components with a low power consumption, the techniques of loose transformer coupling (transponder) or inductive coupling are available. Where the electronic components consume more power, energy can be transmitted through electromagnetic waves of appropriate wavelength. The number of electrical leads for power and data transmission and of the associated plug connectors can be reduced in the first instance by making use of so-called ring circuits which not only supply voltage but also transmit data, for example by modulating the amplitude of the supply voltage (Smart Logic). Ring circuits of this kind can equally be combined with other data transmission techniques such as IR sections, magnetic induction or electromagnetic alternating fields.

The reduction in the number of electrical leads and associated plug contacts achieved by these means results in a considerable lowering of the susceptibility to faults on the part of the internal combustion engine.

What is claimed is:

1. Internal combustion engine with electronic components controlled from a central unit (2) and arranged together with the central unit (2) on the engine in a space that is enclosed by a metal housing part of the internal combustion engine, wherein power to at least some of the electronic components is transmitted without cables by high-frequency electromagnetic waves generated and radiated by a high-frequency source arranged in the space that is fully enclosed by the metal housing part of the internal combustion engine, and wherein the electronic components to be supplied with power by the high-frequency source each have at least one receiving device for receiving the electromagnetic waves.

2. Internal combustion engine in accordance with claim 1, wherein the high-frequency source is part of the central unit (2).

3. Internal combustion engine in accordance with claim 1, wherein the metal housing part of the internal combustion engine is so designed that the field strength of the electromagnetic waves at the receiving devices of the electronic components is high.

4. Internal combustion engine according to claim 3, wherein the housing part produces standing waves in the enclosed space, and the receiving devices of the electrical components to be supplied by the radiated high-frequency electromagnetic waves are disposed at anti-nodes of the standing waves.

5. Internal combustion engine in accordance with claim 1, further comprising waveguides through which the electromagnetic waves are supplied to unfavorably placed electronic components.

6. Internal combustion engine in accordance with claim 1, wherein power transmission to electronic components with low power consumption takes place without cables by of loose transformer coupling or inductive coupling.

7. Internal combustion engine in accordance with claim 1, wherein the high-frequency source for generating the electromagnetic waves, the central unit (2) and the electronic components have devices for transmitting data without cables.

8. Internal combustion engine in accordance with claim 7, wherein the data transmission between the electronic components, the high-frequency source and the central unit (2) takes place without wires through at least one of loose transformer coupling, inductive coupling, IR elements, optical waveguides, and electromagnetic alternating fields of appropriate frequency.

\* \* \* \* \*